United States Patent [19]

Henshaw et al.

[11] 3,857,817

[45] Dec. 31, 1974

[54] THERMOSETTING COATING COMPOSITIONS

[75] Inventors: Bruce Collins Henshaw, Mount Waverley; Bruce Leary, Frankston, both of Australia

[73] Assignee: Dulux Australia Ltd., Melbourne, Victoria, Australia

[22] Filed: May 15, 1973

[21] Appl. No.: 360,453

[30] Foreign Application Priority Data
May 24, 1972 Australia............................ 9068/72

[52] U.S. Cl. .................. 260/67.6 R, 117/132 BF, 117/161 LN, 260/31.6, 260/39 R
[51] Int. Cl............................................. C08g 37/30
[58] Field of Search .............................. 260/67.6 R

[56] References Cited
UNITED STATES PATENTS
3,234,249  2/1966  Brack......................... 260/67.6 R X

OTHER PUBLICATIONS

Bertz et al., Chemical Abstracts, 73: 78079; (1970).

Primary Examiner—Howard E. Schain
Assistant Examiner—W. C. Danison
Attorney, Agent, or Firm—Cushman, Darby & Cushman

[57] ABSTRACT

Novel liquid thermosetting coating compositions are prepared from blends of hexamethoxymethyl melamine and certain ester diols of maximum molecular weight 600. Preferred embodiments provide high solids coatings, with viscosities of less than 20 poise at 25°C at non-volatile contents in excess of 90 percent by weight.

6 Claims, No Drawings

THERMOSETTING COATING COMPOSITIONS

This invention relates to novel thermosetting coating compositions and in particular to such coating compositions comprising blends of etherified methylol melamine with certain ester diols.

In this invention we are concerned with liquid compositions which can be applied to substrates by conventional means, for example by brushing, spraying, dipping and flow-coating, and then cured to provide protective or decorative films thereon. In particular, we are concerned with thermosetting coating compositions, which are valuable and well-known materials of commerce, capable of producing cured paint films of excellent hardness, toughness and durability.

Conventional coating compositions comprise one or more film-forming constituents which, as the name implies, are primarily responsible for the formation of the coating film on its substrate. In the case of thermosetting compositions, it is common to select as the film-forming constituents of the compositions, blends of materials, at least one of which is polymeric and has a typical number average molecular weight of at least 3,000, which co-react during the curing process to form a cross-linked polymeric paint film of very high molecular weight. For example, suitable known compositions of this type are blends of alkyd resins with melamine-formaldehyde or urea-formaldehyde resins. The resins themselves are normally solid or semi-solid at ambient temperature and hence in order to formulate coating compositions which are sufficiently fluid to be applied to substrates by conventional means, the compositions must include solvents for the resins, to lower the composition viscosity. A typical coating composition of this type will contain 40 percent or more by weight of solvent, usually a volatile organic liquid, which must be removed during the curing process, thus presenting a waste-disposal and potential atmospheric pollution problem.

We have now discovered that hard, tough paint films can be prepared from certain constituents all of which are of a surprisingly low molecular weight and that in a preferred embodiment of our invention, the film-forming constituents are of sufficiently low viscosity to permit of their use in coating compositions utilising standard application methods, at non-volatile contents in excess of about 90 percent by weight.

Accordingly, we now provide liquid coating compositions the film-forming constituents of which consist essentially of a blend of (a) methylol melamine containing 4–6 methylol groups per molecule which groups are substantially fully etherified with methanol or ethanol and (b) an ester diol of the structure $$HO-\underset{R}{C}H-Y-\underset{R_1}{C}H-OH$$

wherein Y is a molecular entity of chain-like structure the links of which chain are selected from the moieties

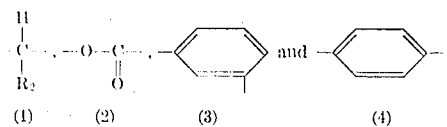

(1) (2) (3) (4)

and R, $R_1$ and $R_2$ are selected from H, $CH_3$ and $C_2H_5$ provided also that the chain shall contain at least two links of the said structure (2) and the ester diol as a whole shall have a molecular weight of 600 maximum.

In one preferred embodiment of the invention the compositions provide coating compositions which are liquid at room temperature and have a maximum viscosity of 20 poise at 25°C at a non-volatile content of at least 90 percent by weight. In this embodiment of our invention the film-forming constituent consists essentially of a blend of components (a) and (b) as hereinabove defined but with the further proviso that the composition of the component (b) must be further limited in the following manner: The substituents R and $R_1$ are selected from H and $CH_3$ and there shall be present in the molecular entity Y no more than four links of the moiety (1) and no more than one link selected from the moieties (3) and (4).

When we require that the film-forming constituents of our invention shall consist essentially of a blend of constituents (a) and (b) we refer to the practice of utilising certain auxiliary materials for special purposes in paint compositions. Certain of these materials, for example, pigment dispersing agents and rheology modifiers, may themselves be polymeric and hence contribute to the total film-forming constituents of the compositions. We do not exclude the application of such common practices in the performance of our invention, but bearing in mind that these auxiliary materials are normally used at very low concentrations, for example 0.5 – 5.0 percent maximum by weight of the total composition, their contribution to the film-forming constituents is minimal and is comprehended by our above-defined composition. It is also to be understood that the components from which our compositions are prepared can, and usually will be, commercial products. In accordance with established practice such products may well contain a small amount of the order of a few percent by weight of impurities which, if suitably reactive, could become incorporated as a minor chance component of the cured paint film.

The methods of preparing ethers of methylol melamine are well-known and involve the reaction of melamine with formaldehyde and etherification of the resultant methylol groups with the appropriate alcohol. A single alcohol may be used as the etherifying agent or a mixture of methanol and ethanol may be used to give mixed ethers.

The ester diol component (b) consists essentially of a backbone of covalently bonded carbon atoms and at least two oxygen atoms and in addition it is terminated at each end of the backbone by a hydroxyl group. The oxygen atoms of the backbone are consequential on the presence of ester links, and hence the moiety (2), in the chain Y of the component. The nature of any other atoms depending from the backbone is governed by the above-defined permitted links of the chain Y and by the selection of R and $R_1$.

Thus component (b) may be a condensation product of a glycol with a suitable dibasic acid or acid anhydride.

Suitable glycols are, for example:
ethylene glycol, propylene glycol and butane 1, 2 diol.
The acid constituent may be for example:
succinic acid (anhydride), glutaric acid, adipic acid, azaleic acid, iso-phthalic acid or terephthalic acid.

Suitable constituents for use in our preferred embodiment are, for example, ethylene glycol, propylene glycol, succinic acid, iso-phthalic acid and terephthalic acid.

Component (b) need not, however, be prepared from glycols and dibasic acids. Alternatively, it may be prepared from a dibasic acid or acid anhydride as described above by reacting it with an alkylene oxide. Suitable alkylene oxides are, for example, ethylene oxide and propylene oxide.

The coating compositions are prepared by blending components (a) and (b) together in suitable proportions, optionally in the presence of a minor proportion of a volatile organic solvent compatible therewith. In general, we select the proportions of components in the molar ratio (a):(b) of the order of 1:3 or alternatively in a weight proportion corresponding to the stoichometric balance between hydroxyl groups of component (b) and ether groups of component (a).

The compositions may be pigmented by dispersing therein paint pigments in a conventional manner to impart the desired opacity and colour to them. As mentioned above, minor amounts of auxiliary materials may also be added to, for example, adjust the rheology of the paint compositions or to aid the dispersion of pigment therein.

In our preferred embodiment of the invention in particular it may be found unnecessary to use any volatile organic liquid at all to achieve a useful application viscosity for the paints, but bearing in mind that pigmentation of the paints may increase their viscosity or otherwise adversely affect their flow, it can be an advantage at times to incorporate a small amount of such a liquid in the compositions. We have found, however, that the viscosity of these compositions falls very quickly with the addition of organic liquid and although we might, on occasions, have to use up to 10 percent by weight based on the total composition of such a liquid to meet specific application requirements, when working with our preferred compositions, non-volatile contents of from 95–100 percent by weight have been achieved at a satisfactory working viscosity.

As mentioned above, the film-forming constituents of this invention are all of unusually low molecular weight compared with constituents used hitherto for this purpose and hence they are correspondingly more volatile. Our method of determining non-volatile contents has been chosen to take account of this and also of the inaccuracies which can occur unless potentially chemically reactive mixtures are tested under carefully selected and standardised conditions. We have, therefore, standardised on the testing procedures of the American Society for Testing and Materials method D 1644 – 59. Method A, but limiting the heating time to 1 hour at 105°C, in determining our non-volatile contents.

The coatings require stoving at temperatures of the order of 130°C and for 30 – 60 minutes. It is a useful characteristic of our compositions that they appear to resist quite significantly extended over-baking cycles without a serious deterioration in their properties.

In order to cure the compositions at these stoving cycles, the reaction between components (a) and (b) must be catalysed and this is done by using materials known to accelerate the reaction between hydroxyl and ether groups, for example in the cross-linking of hydroxylated alkyd resins and etherified urea-formaldehyde resins.

A suitable catalyst is, for example, p-toluene sulphonic acid, used at a concentration of 0.5 percent by weight on the combined weight of components (a) and (b).

The invention is illustrated by the following examples in which all parts are given by weight:

EXAMPLE 1.

Preparation of a composition according to the invention in which the moieties of the ester diol were as follows:

$$R = CH_3$$
$$R_1 = CH_3$$

and Y comprised four of moiety

and two of moiety

Molecular weight 234.

An ester diol was prepared by two methods, one of which gave a higher yield of ester diol than the other, and each sample of ester diol was then tested in a coating composition.

Preparation of ester diol.

Method (a)

The following materials were charged into a flask equipped with stirrer and condenser.

| Succinic anhydride | 200 parts |
|---|---|
| propylene glycol | 760 do. |
| zinc oxide | 0.5 do. |

The mixture was slowly heated to reflux. After one hour at reflux, 450 parts of excess propylene glycol were slowly distilled off. The residue was a liquid with acid value 0.3 mgm KOH/gm., Gardner Holt viscosity of R and a high shear viscosity as measured by a cone and plate viscometer of 4 poise at 25°C. The nonvolatile content was determined by the method described hereinabove to be 85 percent by weight. Some unreacted propylene glycol impurity was detected in the sample.

Method (b)

One hundred and eighteen parts of succinic acid were added to a reaction flask fitted with a mechanical stirrer and very efficient reflux condenser. The flask was heated to 150°C and a mixture of

| propylene oxide | 116.0 parts |
|---|---|
| dimethylethanolamine | 0.3 do. | added slowly at a rate sufficient to maintain a steady reflux at 150°C. Additional propylene oxide was added as required to make up for losses from the reaction flask and heating continued until the mixture in the flask had an acid value of less than 1 mgm KOH/gm. The mixture was then cooled. The ester diol so-prepared was a liquid with a viscosity of 17 poise at 25°C and non-volatile content as determined by the method described hereinabove of 92 percent by weight.

Preparation of coating compositions.

The following components were used to prepare two coating compositions:

|  | Coating (a) | Coating (b) |
| --- | --- | --- |
| hexamethoxymethyl melamine | 39 parts | 39 parts |
| ester diol from method (a) | 70 do. | — |
| ester diol from method (b) | — | 70 do. |
| p-toluene sulphonic acid | 0.25 do. | 0.25 do. |

Hexamethoxymethyl melamine is commercially available as "Cymel" 300 or 301 ("Cymel" is a registered trade mark). "Cymel" 300 is solid and "Cymel" 301 is liquid but the two gave identical results in our tests.

The components were gently warmed and mixed until homogeneous. A 125 micron film of each coating composition was drawn down on a glass plate and then baked at 130°C for one hour. The resultant films were tested for hardness on a Tukon hardness tester and mechanical characteristics were assessed. The properties of the compositions and the films obtained therefrom were as follows:

|  | Coating (a) | Coating (b) |
| --- | --- | --- |
| Viscosity at 25°C (poise) | 4 | 10 |
| Non-volatile content by wt. | 90% | 93% |
| Hardness of baked film (knoops) | 9.0 | 4.5 |
| Flexibility | V.Good | V.Good |

It will be noted that the paint film of coating (a) which comprised ester diol of method (a) was harder than but otherwise equivalent to that of coating (b). It appears likely that this difference in properties was associated with the chance inclusion of impurities of propylene glycol in the ester diol (a).

EXAMPLE 2.

Preparation of a composition according to the invention in which $R = CH_3$ $R_1 = CH_3$ and Y comprised six of moiety

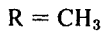

and two of moiety

Molecular weight 262

The preparation of the composition was analogous to that of the composition of Example 1 using method (b) for the preparation of the ester diol and substituting a chemically equivalent amount of adipic acid for the succinic anhydride of that example. The composition was tested according to the methods of Example 1 and the results were as follows:

| Viscosity at 25°C (poise) | 3–4 |
| --- | --- |
| Non-volatile content by wt. | 90% |
| Hardness of baked film (Knoops) | 3–4 |
| Flexibility | Excellent |

The composition which lies within the scope of the invention but not within the preferred range, exhibited a combination of properties which were good but not as outstanding as those of the compositions of Example 1.

EXAMPLE 3.

Preparation of a preferred composition according to the invention using an ester diol in which $R = CH_3$ $R_1 = CH_3$ and Y comprised two each of moiety

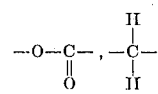

and one of moiety

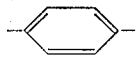

Molecular weight 264

The ester diol was prepared as follows:

The following components were heated in an autoclave at 120°C for 10 hours.

| propylene oxide | 122.0 parts |
| --- | --- |
| terephthalic acid | 166.0 do. |
| Armeen DMCD * | 0.25 do. |

*a tertiary amine catalyst - "Armeen" is a registered trade mark.

The propylene oxide used included a 5 percent excess over the required stoichiometric quantity.

The resultant ester diol was processed into a composition according to the invention by the general method of Example 1. The composition was then tested according to the methods of Example 1 with the following results.

| Viscosity at 25°C (poise) | 15 |
| --- | --- |
| Non-volatile content by wt. | 90% approx. |
| Hardness of baked film (Knoops) | 15 |
| Flexibility | V.Good |

This preferred composition showed an excellent combination of properties. In particular the baked film exhibited an outstanding combination of hardness and flexibility.

When the example was repeated using iso-phthalic acid in place of the tere-phthalic acid similar results were obtained. However, when ortho-phthalic acid was substituted for the tere-phthalic acid, the ester diol so-produced had a viscosity well in excess of 20 poise at 25°C and 90 percent non-volatile content by weight. A baked film prepared therefrom by the method of example 1 was very hard, with a knoop hardness of greater than 20, but it was too brittle to be a practicable coating.

EXAMPLE 4.

Preparation of a composition according to the invention in which

R = CH$_3$

R$_1$ = CH$_3$ and Y comprised nine of moiety

and two of moiety

Molecular weight 332

The preparation of the ester diol was carried out according to the method of Example 3 substituting a chemically equivalent quantity of azelaic acid for the terephthalic acid.

The ester diol was processed into a composition according to the invention and tested according to the methods of Example 1. The results were as follows:

| | |
|---|---|
| Viscosity at 25°C (poise) | under 20 poise |
| Non-volatile content by wt. | 90% |
| Hardness of baked film (Knoops) | under 3 |
| Flexibility | Excellent but film soft |

This composition exhibited properties which were inferior to the preferred compositions of Examples 1 and 3.

EXAMPLE 5.

An illustration of the effect of altering the number of

moiety (hereinafter referred to as "Moiety (2)" content of the ester diol).

These compositions were prepared using diols with a number of moieties (2) other than two. These diols were a. propylene glycol (no moieties (2)).
b. decan - 1, 10-diol (no moieties (2)).
c. 2, 2-dimethyl-3-hydroxypropyl 2, 2 dimethyl - 3 - hydroxypropionate. (Esterdiol-204 available from Union Carbide Corp.) (one moiety (2)).

All had molecular weights below 600.

Compositions were prepared from these diols and then tested according to the methods of Example 1, and the results compared with those of the preferred composition from Example 1.

| Diol | Appln. viscosity at 25° (poise) | Hardness after baking (knoops) | Mechanical characteristics |
|---|---|---|---|
| (a) | 3 | 30 | very brittle |
| (b) | solid | 12 | brittle |
| (c) | solid | 16 | brittle |
| Example 1 | 3–4 | 9 | flexible |

The compositions using a diol with less than two moieties (2) were very hard but brittle. Only the composition according to the invention gave satisfactory results.

EXAMPLE 6

Preparation of a paint composition based on a composition according to the invention and comparison with a commercially available baking enamel.

A paint composition was prepared from an ester diol of Example 1 as follows:

(1) The following ingredients were blended, sand-ground and filtered.

| | |
|---|---|
| Ester diol (from method (a) of Example 1) | 350 parts |
| titanium dioxide | 200 do. |
| pigment dispersant * | 30 do. |

(2) The following ingredients were gently warmed and mixed until all the acid catalyst had dissolved.

| | |
|---|---|
| blend from stage (1) | 480 parts |
| hexamethoxymethyl melamine | 175 do. |
| p-toluenesulphonic acid (catalyst) | 2.5 do. |

\* The pigment dispersant used was a polymeric proprietary product of undisclosed composition. It can be replaced by any known pigment dispersant which is compatible with the film-forming components of this example.

The paint composition was subjected to a series of tests used by the Ford Motor Company for testing automotive enamels and well-known to the art. A commercially available acrylic enamel was subjected to the same series of tests.

For these tests, the paint composition and the enamel were sprayed on to steel panels to the thickness required for a specific test and baked in an oven for one hour at 130°C. The paint composition according to the invention was thinned by a small addition of methyl ethyl ketone to the order of 90 percent solids by weight for spray application. The commercial enamel was sprayed at 40 percent solids and twice as many coats were required to give the same film build.

The results were as follows:

| Test | Results | |
|---|---|---|
| | Example 6 paint composition | Acrylic Enamel |
| Abrasion test (Ford test method BI 7-1) | passed (superior to enamel) | passed |
| Cold crack test (Ford test method BI 7-2) | passed | passed |
| Conical mandrel elongation (Ford test method BI 5-1) | passed (superior to enamel) | passed |
| Water soak test (Ford test method BI 4-1) | passed | passed |
| Accelerated weathering (Ford test method BO-11) | passed | passed |

The paint composition according to the invention was superior in performance to the acrylic enamel and could be applied at higher solids.

EXAMPLE 7

Preparation of a composition according to the invention in which $$R = CH_3,$$

$R_1 = CH_3$ and Y comprises seven of the moieties

one moiety

and four of the moieties

Molecular weight 392

An ester diol was prepared as follows:

The following materials were charged into a reaction flask equipped with a stirrer and a very efficient condenser.

| propylene glycol | 76 parts |
|---|---|
| succinic anhydride | 200 do. |

The flask was heated to 140°C while an inert gas blanket was maintained over the contents. Cooling was applied as required to control an exotherm which developed to maintain a batch temperature of about 180°C maximum. When the temperature had fallen to 150°C a mixture of

| propylene oxide | 116.0 parts |
|---|---|
| dimethylethanolamine | 0.3 do. | was added slowly at a rate sufficient to maintain a steady reflux at 150°C. Additional propylene oxide was added as required to make up losses from the batch and heating continued until the mixture in the flask had an acid value of less than 1 mgm KOH/gm. The mixture was then cooled to give a slightly viscous liquid ester diol of non-volatile content 98 percent by weight. When the nonvolatile content was reduced to 90 percent by wt. by the addition of methyl ethyl ketone, the viscosity at 25°C was 5 poise.

A coating composition was prepared by gently warming together the following mixture and stirring until homogenous:

| hexamethoxymethyl melamine | 15.0 parts |
|---|---|
| ester diol (above) | 25.0 do. |
| p-toluene sulphonic acid | 0.2 do. |

The composition was then tested by the method of example 1 with the following results:

| Viscosity at 25°C (poise) | 12 |
|---|---|
| Non-volatile content by wt. | 91% |
| Hardness of baked film (knoops) | 6 |
| Flexibility | V.Good |

EXAMPLE 8.

Comparison of the performance of an ester triol and an ester diol in a composition otherwise according to the invention.

An ester triol was prepared by the general method of example 7 but substituting an equimolar amount of glycerol for the propylene glycol of that example. Molecular weight 408.

The ester triol so-produced was a very viscous liquid with a non-volatile content of 98 percent by wt. On reducing the non-volatile content to 90 percent by weight by the addition thereto of methyl ethyl ketone the viscosity at 25°C was greater than 20 poise. When processed into a coating composition by the method of example 7 and tested as described in example 1, the following results were obtained:

| Viscosity at 25°C (poise) | 30 |
|---|---|
| Non-volatile content by wt. | 89% |
| Hardness of baked film (Knoops) | 18 |
| Flexibility | brittle |

The results show that a composition comprising an ester triol compares unfavourably in properties with a composition according to the invention. The brittleness of the baked film is a generally unfavourable characteristic.

EXAMPLE 9.

The coating of metal strip (coil-coating) with paint compositions of conventional type and of compositions according to this invention shows, in a comparative test, the advantage of high application solids which can be achieved by the novel compositions of this invention.

A pigment dispersant was prepared for use in these inventions in the following way.

A reaction flask fitted with a mechanical stirrer and reflux condenser was charged with 190 parts of methyl ethyl ketone and heated to reflux. The following mixture was added slowly and at a uniform rate over a period of 1½ hours to the flask, maintaining a gentle reflux all the time:

| methyl methacrylate | 160.0 | parts |
|---|---|---|
| hydroxypropyl acrylate (approx. 5% wt. acrylic acid) | 40.0 | do. |
| methacrylic acid | 1.0 | do. |
| azodiisobutyronitrile | 2.7 | do. |
| tert. - dodecyl mercapton | 6.0 | do. |

A pre-mix of 1.0 part azodiisobutyronitrile and 19.0 parts methyl ethyl ketone was then added similarly over a period of 1 hour. Refluxing was continued for a further 2 hours then the batch allowed to cool to give a solution of polymeric pigment dispersant of 50.0 percent solids by wt., viscosity 2.7 poise at 25°C and acid value 10 mgm KOH per gm.

A mill-base was then prepared by passing the following mixture through a conventional sand-grinding mill:

| | | |
|---|---|---|
| titanium dioxide pigment | 500 | parts |
| pigment dispersant (above) | 64 | do. |
| hexamethoxymethyl melamine | 156 | do. |
| methyl ethyl ketone | 30 | do. |
| | 750 | do. |

Paint compositions were then prepared by mixing together the following:

| | Paint A | | Paint B | |
|---|---|---|---|---|
| mill-base (above) | 60.0 | parts | 60.0 | parts |
| hexamethexymethyl melamine | 2.5 | do. | 2.5 | do. |
| ester diol (method (b) of example 1) | 25.0 | do. | — | |
| ester diol (from example 7) | — | | 25.0 | do. |
| p-toluene sulphonic acid | 0.2 | do. | 0.2 | do. |

Each composition was adjusted to a viscosity of 5.3 poise at 25°C with methyl ethyl ketone. The non-volatile contents were approximately 93 percent by wt. As a reference standard for comparisons, a commercial coil-coating acrylic enamel was selected, the material chosen being typical of current products in use for this application.

Samples of each of the experimental paints and the reference paint were applied to aluminium panels which had been pre-primed with a commercial coil-coating primer. Each paint was applied at a sufficient film build to give a dry film thickness of approximately 1.0 mil. The coated panels were then baked for one minute at a peak panel temperature of 200°C and then subjected to a series of tests typical of those used in the coil coating industry. The results were as follows:

| Test | Paint A | Paint B | Acrylic Enamel |
|---|---|---|---|
| Pencil hardness | 2 H | 2 H | H |
| T bend flexibility* | pass 2 T | pass 2 T | pass 2 T |
| Impact resistance (inch pounds to fail) | pass 30 | pass 30 | pass 30 |
| Non-volatile content by wt. at application viscosity (approx. 4 poise at 25°C) | 90.0% | 90.2% | 48% |

* lower numbers represent better performance.

The compositions according to the invention were equivalent in performance to the commercial enamel but they showed the advantage of being applicable at much higher non volatile contents.

EXAMPLE 10.

The effect of exceeding the stipulated values of R and $R_1$ is demonstrated. In this example R and $R_1$ are the same and have the following ideal formula

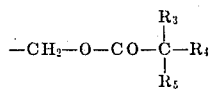

where $R_3$, $R_4$ and $R_5$ are alkyl groups totalling approximately 9 carbon atoms. R and $R_1$ were, in fact, residues of the commercial material known as Cardura E (Cardura is a trade mark of Shell Chemicals Ltd.). Molecular weight of ester diol 608.

An ester diol was prepared from Cardura E by the general method of example 1, method (b) substituting a chemically equivalent amount of Cardura E for the propylene oxide of that example.

When processed into a paint composition by the method of example 1, a paint with the following characteristics was obtained.

| | |
|---|---|
| Viscosity at 25°C (poise) | less than 20 |
| Non-volatile content by wt. | approx. 90% |
| Hardness of baked film (Knoops) | less than 3 |
| Nature of film | soft and weak. |

The markedly inferior properties of this film compared with that of the reference example 1 film is apparent.

We claim:

1. A liquid coating composition the film-forming constituents of which consist essentially of a blend of
   a. methylol melamine containing 4 – 6 methylol groups per molecule which groups are fully etherified with methanol or ethanol, and
   b. an ester diol of the structure

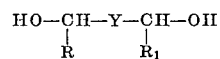

wherein Y is a molecular entity of chainlike structure the links of which chain are selected from the moieties

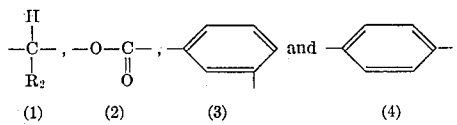

(1)  (2)  (3)  (4)

and R, $R_1$ and $R_2$ are selected from H, $CH_3$ and $C_2H_5$ provided also that the chain shall contain at least two links of the structure (2) and ester diol shall have a maximum molecular weight of 600 the components (a) and (b) being blended in a molar ratio of from 1:1.67 to 1:3.

2. A liquid coating composition according to claim 1 which has a maximum viscosity of 20 poise at 25°C and a non-volatile content of at least 90 percent by weight, wherein the composition of the ester diol (b) is limited by the further requirement that the substituents R and $R_1$ are selected from H and $CH_3$ and there shall be present in the molecular entity Y no more than four links of the moiety (1) and no more than one link selected from the moieties (3) and (4).

3. A liquid coating composition according to claim 1 wherein the ester diol (b) is a condensation product of a glycol and a dibasic acid or acid anhydride.

4. A liquid coating composition according to claim 3 wherein the glycol is ethylene glycol, propylene glycol or butane 1, 2 diol and the acid or acid anhydride is succinic acid, succinic anhydride, glutaric acid, adipic acid, azaleic acid, isophthalic acid or tere-phthalic acid.

5. A liquid coating composition according to claim 1 wherein component (a) and component (b) are blended in the molar ratio of the order of 1:3.

6. A liquid coating composition according to claim 2 wherein the ester diol (b) is a condensation product of ethylene glycol or propylene glycol and succinic acid, iso-phthalic acid or tere-phthalic acid.

* * * * *